United States Patent
Eriyama

(10) Patent No.: US 7,916,992 B2
(45) Date of Patent: Mar. 29, 2011

(54) DRY FILM FOR OPTICAL WAVEGUIDE AND METHOD FOR MANUFACTURING OPTICAL WAVEGUIDE BY USING THE DRY FILM

(75) Inventor: Yuichi Eriyama, Tokyo (JP)

(73) Assignee: JSR Corporation, Tokyo (JP)

( * ) Notice: Subject to any disclaimer, the term of this patent is extended or adjusted under 35 U.S.C. 154(b) by 102 days.

(21) Appl. No.: 12/373,564

(22) PCT Filed: Jul. 18, 2007

(86) PCT No.: PCT/JP2007/064140
§ 371 (c)(1),
(2), (4) Date: Jan. 13, 2009

(87) PCT Pub. No.: WO2008/010502
PCT Pub. Date: Jun. 24, 2008

(65) Prior Publication Data
US 2009/0317043 A1    Dec. 24, 2009

(30) Foreign Application Priority Data

Jul. 18, 2006 (JP) .................. 2006-195081

(51) Int. Cl.
*G02B 6/10* (2006.01)
*C03B 37/022* (2006.01)
(52) U.S. Cl. ........... 385/132; 385/129; 385/131; 65/386
(58) Field of Classification Search .................. 385/132; 65/386
See application file for complete search history.

(56) References Cited

U.S. PATENT DOCUMENTS

| 2002/0150368 A1 * | 10/2002 | Imoto .......................... 385/132 |
| 2004/0234224 A1 | 11/2004 | Ishizaki et al. |
| 2008/0260341 A1 * | 10/2008 | Shibata et al. ................ 385/129 |
| 2009/0196562 A1 * | 8/2009 | Ishida et al. ................... 385/130 |

FOREIGN PATENT DOCUMENTS

| CN | 1318737 A | 10/2001 |
| JP | 2005 62346 | 3/2005 |
| JP | 2005 99514 | 4/2005 |
| JP | 2005 115047 | 4/2005 |
| WO | 2004 027472 | 4/2004 |
| WO | WO 2006001447 A1 * | 1/2006 |
| WO | 2006 038691 | 4/2006 |

* cited by examiner

*Primary Examiner* — Hemang Sanghavi
(74) *Attorney, Agent, or Firm* — Oblon, Spivak, McClelland, Maier & Neustadt, L.L.P.

(57) ABSTRACT

Provided is an optical waveguide manufacturing method that makes the thickness of a clad layer in the vicinity of a core portion uniform. A first lamination film is fabricated by forming a clad layer by forming a first curable resin layer for clad formation on a first base film and curing the first curable resin layer, and forming a core portion by forming a second curable resin layer for core formation having a higher refractive index than that of the clad layer after cured on the clad layer and selectively curing the second curable resin layer. A second lamination film is fabricated by forming a clad layer by forming a third curable resin layer for clad formation on a second base film and curing the third curable resin layer. In the optical waveguide manufacturing method, the first lamination film in which the core portion is formed and the second lamination film are bonded together with a fourth curable resin layer for clad formation interposed therebetween, and the curable resin layer interposed between the first lamination film and the second lamination film is cured to form a clad layer.

19 Claims, 4 Drawing Sheets

DRY FILM FOR OPTICAL WAVEGUIDE AND METHOD FOR MANUFACTURING OPTICAL WAVEGUIDE BY USING THE DRY FILM

TECHNICAL FIELD

The present invention relates to a dry film for an optical waveguide and a method of manufacturing an optical waveguide using the dry film.

BACKGROUND ART

In an optical waveguide using a photo-curable resin such as plastic, in contrast to an optical waveguide using another material, deformation of a core portion and a clad portion or fracture of the core portion due to temperature change do not occur because it is cured when exposed to light. Further, because the optical waveguide is made of a photo-curable resin, it offers an advantage in that a complicated optical waveguide can be formed easily with use of a process. Thus, application to a low-cost and high-performance optical waveguide element is anticipated and examined.

FIGS. 4A to 4C show a method of manufacturing an optical waveguide according to a related art. First, a lower substrate 93 in which a lower clad layer 92 is laminated on a lower base film 91 is prepared. A core 94 is placed on the lower substrate 93. Further, an upper substrate 97 in which a curable resin layer 96 is laminated on an upper base film 95 is prepared. Then, the upper substrate 97 is pressed on top of the lower substrate 93. At this time, the curable resin layer 96 is deformed into a shape surrounding the core 94 because it is flexible.

After that, by exposure to light, the curable resin layer 96 changes into a clad layer 98. An optical waveguide device 90 in which the clad layers 92 and 98 are formed so as to surround the core 94 is thereby fabricated (e.g. Patent Document 1).

[Patent Document 1]
Japanese Unexamined Patent Application Publication No. 2005-115047

DISCLOSURE OF THE INVENTION

Problems to be Solved by the Invention

However, when pressing the upper substrate 97 on top of the lower substrate 93, it is difficult to maintain a uniform distance between the core 94 and the upper base film 95 because the film is flexible. A change in the thickness of the clad layer in the vicinity of the core 94 affects the optical properties propagating through the core 94. Further, because the position of the core 94 inside the clad layer is not determined, the positioning when mounting the optical waveguide is difficult. The present invention has been accomplished to solve the above problems and an object of the present invention is thus to provide a dry film for an optical waveguide and a method of manufacturing an optical waveguide using the dry film.

Means for Solving the Problems

A dry film for an optical waveguide according to a first aspect of the present invention includes a base film, a clad layer formed on the base film and cured, and an uncured composition layer for core formation formed on the clad layer. A dry film for an optical waveguide according to a second aspect of the present invention is the above-described dry film for an optical waveguide in which the composition layer for core formation is a photo-curable resin layer.

A dry film for an optical waveguide according to a third aspect of the present invention includes a base film, a clad layer formed on the base film and cured, and an uncured composition layer for clad formation formed on the clad layer. A dry film for an optical waveguide according to a fourth aspect of the present invention is the above-described dry film for an optical waveguide in which the composition layer for clad formation is a photo-curable resin layer.

A dry film for an optical waveguide according to a fifth aspect of the present invention is the above-described dry film for an optical waveguide in which the base film transmits light for curing the curable resin by 50% or more. The use of such a base film enables incidence of light to the dry film through the base film to thereby cure the uncured curable resin. A dry film for an optical waveguide according to a sixth aspect of the present invention is the above-described dry film for an optical waveguide in which a release film is further laminated. This facilitates handling of an uncured layer.

A method of manufacturing an optical waveguide according to a seventh aspect of the present invention is the method of manufacturing the optical waveguide including a core portion allowing propagation of light and a clad portion placed to surround the core portion, that includes bonding a first lamination film including a first base film, a first clad layer formed on the first base film, and a core portion formed on the first clad layer and having a higher refractive index than the clad layer with a second lamination film including a second base film and a second clad layer formed on the second base film in such a way that the core portion of the first lamination film and the second clad layer of the second lamination film face each other with a curable resin layer for clad formation interposed therebetween, and curing the curable resin layer for clad formation interposed between the first lamination film and the second lamination film. This makes the thickness of the clad layer in the optical waveguide uniform.

A method of manufacturing an optical waveguide according to an eighth aspect of the present invention is the method of manufacturing the optical waveguide including a core portion allowing propagation of light and a clad portion placed to surround the core portion, that includes bonding a first lamination film including a first base film, a first clad layer formed on the first base film, and a core portion formed on the first clad layer and having a higher refractive index than the first clad layer with a second lamination film being a dry film including a second base film, a second clad layer formed on the second base film, and a curable resin layer formed on the second clad layer and made of a curable resin for clad formation in such a way that the core portion of the first lamination film and the curable resin layer of the second lamination film face each other, and curing the curable resin layer. This makes the thickness of the clad layer in the optical waveguide uniform.

A method of manufacturing an optical waveguide according to a ninth aspect of the present invention is the above-described method of manufacturing the optical waveguide in which light transmitted through the base film is used for curing the curable resin. This enables incidence of light through the base film, thereby easily curing the photo-curable resin.

A method of manufacturing an optical waveguide according to a tenth aspect of the present invention is the above-described method of manufacturing the optical waveguide in which a relative index difference between the clad layer and the core layer is 1% or larger. This enables creation of an optical waveguide that guides light efficiently.

A method of manufacturing an optical waveguide according to an eleventh aspect of the present invention is the method of manufacturing the optical waveguide in which the clad layer and the core layer are made of the same constituent with a different compositional ratio. The adhesiveness between the core portion and the clad layer is improved by creating them using the same constituent with a different compositional ratio.

Advantageous Effects of the Invention

A method of manufacturing an optical waveguide according to the present invention can maintain a uniform thickness of a clad layer in the vicinity of a core portion. This improves the optical properties in the optical waveguide. Further, because the clad layer thickness is uniform, the positioning with an optical element is easy, and the bending durability as a film waveguide is enhanced.

DESCRIPTION OF REFERENCE NUMERALS

Figure 1A:
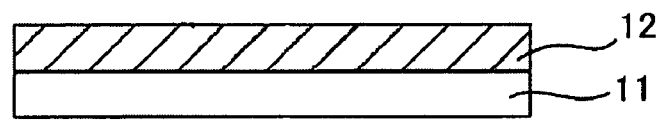
FIG. 1A is a view showing a first step in a method of manufacturing a lower substrate of an optical waveguide according to the present invention.
Figure 1B:
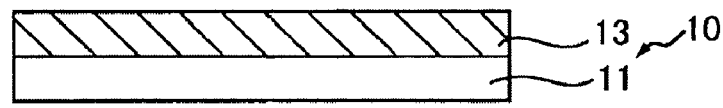
FIG. 1B is a view showing a second step in a method of manufacturing a lower substrate of an optical waveguide according to the present invention.
Figure 1C:
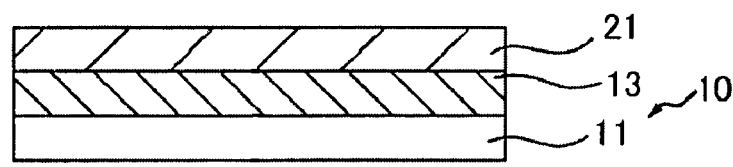
FIG. 1C is a view showing a third step in a method of manufacturing a lower substrate of an optical waveguide according to the present invention.
Figure 1D:
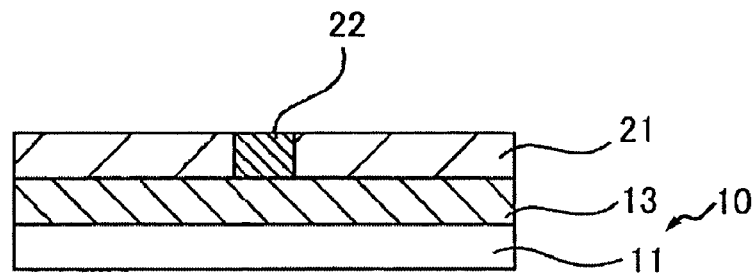
FIG. 1D is a view showing a fourth step in a method of manufacturing a lower substrate of an optical waveguide according to the present invention.
Figure 1E:
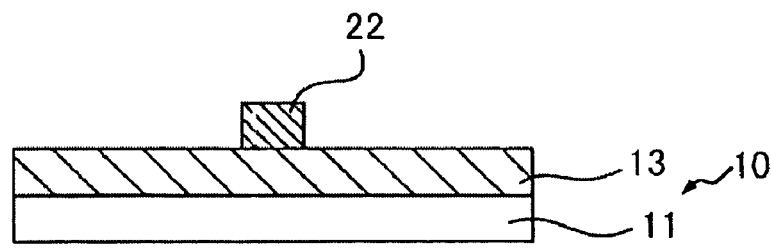
FIG. 1E is a view showing a fifth step in a method of manufacturing a lower substrate of an optical waveguide according to the present invention.
Figure 2A:
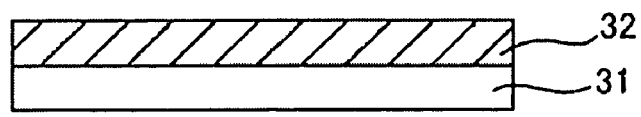
FIG. 2A is a view showing a first step in a method of manufacturing an upper substrate of an optical waveguide according to the present invention.
Figure 2B:
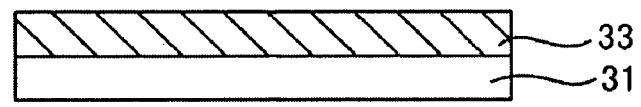
FIG. 2B is a view showing a second step in a method of manufacturing an upper substrate of an optical waveguide according to the present invention.
Figure 2C:
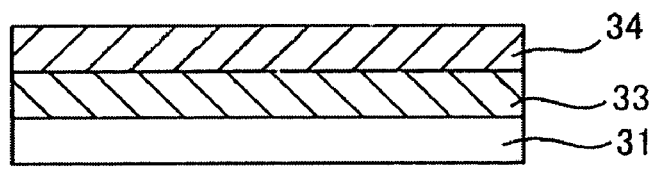
FIG. 2C is a view showing a third step in a method of manufacturing an upper substrate of an optical waveguide according to the present invention.
Figure 2D:
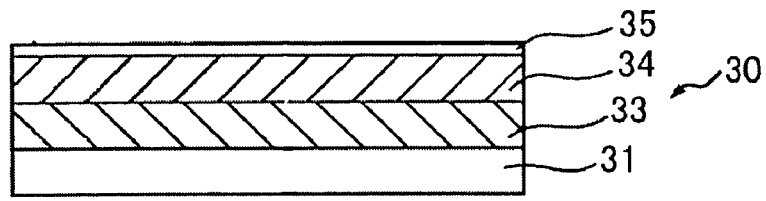
FIG. 2D is a view showing a fourth step in a method of manufacturing an upper substrate of an optical waveguide according to the present invention.

10 LOWER SUBSTRATE PORTION
11 LOWER BASE FILM
12 PHOTO-CURABLE RESIN LAYER FOR CLAD FORMATION
13 LOWER CLAD LAYER
21 PHOTO-CURABLE RESIN LAYER FOR CORD FORMATION
22 CORE PORTION
30 UPPER SUBSTRATE PORTION
31 UPPER BASE FILM
32 PHOTO-CURABLE RESIN LAYER FOR CLAD FORMATION
33 UPPER CLAD LAYER
34 PHOTO-CURABLE RESIN LAYER FOR CLAD FORMATION
35 RELEASE FILM
36 CLAD LAYER
90 OPTICAL WAVEGUIDE DEVICE
91 LOWER BASE FILM
92 LOWER CLAD LAYER
93 LOWER SUBSTRATE
94 CORE
95 UPPER BASE FILM
96 CURABLE RESIN LAYER
97 UPPER SUBSTRATE
98 CLAD LAYER

BEST MODES FOR CARRYING OUT THE INVENTION

A specific embodiment of the present invention is described hereinafter in detail with reference to the drawings. In the following embodiment, the present invention is applied to a dry film for an optical waveguide and a method of manufacturing an optical waveguide using the dry film. In the method of manufacturing an optical waveguide according to this embodiment, previously cured clad layers are formed above and below a core so that the core is placed between the clad layers, thereby making the thickness of the clad layer in the vicinity of the core uniform. In this embodiment, a case where a photo-curable resin layer is used as a curable resin layer is described as an example.

An example of a curable composition for an optical waveguide is a composition containing a resin having polymerizable functional groups such as ethylenically unsaturated groups and/or an urethane(meth)acrylate oligomer, a polymerizable monomer, a photopolymerization initiator, and so on. A composition for a core becomes alkali-developable by making the resin having polymerizable functional groups such as ethylenically unsaturated groups alkali-soluble.

The resin having polymerizable functional groups such as ethylenically unsaturated groups may be obtained by adding a compound containing glycidyl groups and ethylenically unsaturated groups, a compound containing isocyanate groups and ethylenically unsaturated groups, or acryloyl chloride to poly(meth)acrylate having carboxyl groups or hydroxyl groups, for example. The resin becomes alkali-developable by co-polymerizing acrylic acid or methacrylic acid and introducing carboxyl groups into the resin at this time. Further, a compound that contains a straight-chain structure repeatedly having a polyethylene oxide structure, a polypropylene oxide structure or an urethane bond, and has two to six (meth)acryloyl groups may be used.

The urethane(meth)acrylate oligomer is a reactant of a polyester polyol compound, a polyisocyanate compound and a hydroxyl group-containing (meth)acrylate.

The polyol compound is a compound having two or more hydroxyl groups in a molecule. Examples of such a compound are aromatic polyether polyol, aliphatic polyether polyol, alicyclic polyether polyol, polyester polyol, polycarbonate polyol, polycaprolactone polyol and so on. Particularly, it is preferred to use a polyether polyol compound containing an alkylene oxide structure in order to further improve the adhesiveness between a substrate and an optical waveguide.

The polyisocyanate compound is a compound having two or more isocyanate groups in a molecule.

The hydroxyl group-containing (meth)acrylate is a compound having hydroxyl groups and (meth)acryloyl groups in a molecule.

The proportion of the composition of materials that make up the urethane(meth)acrylate oligomer according to the present invention is: 0.5 to 2 mol of polyol compound and 1 to 2.5 mol of polyisocyanate compound with respect to 1 mol of hydroxyl group-containing (meth)acrylate, for example.

The number-average molecular weight (in terms of polystyrene as measured using gel permeation chromatography) of the urethane(meth)acrylate oligomer is preferably 1000 to 100000, more preferably 3000 to 60000, and even more preferably 5000 to 30000. If the number-average molecular weight is less than 1000, it is difficult to obtain sufficient bending durability of a film-like cured product. On the other hand, if the number-average molecular weight is more than 100000, the viscosity of the composition is too high, causing degradation of coating properties.

As a manufacturing method of the urethane(meth)acrylate oligomer, the following methods 1 to 4 may be used, for example.

Method 1: A method of feeding and making a reaction of a polyol compound, a polyisocyanate compound and a hydroxyl group-containing (meth)acrylate altogether.

Method 2: A method of making a reaction of a polyol compound and a polyisocyanate compound and then making a reaction of a hydroxyl group-containing (meth)acrylate.

Method 3: A method of making a reaction of a polyisocyanate compound and a hydroxyl group-containing (meth) acrylate and then making a reaction of a polyol compound.

Method 4: A method of making a reaction of a polyisocyanate compound and a hydroxyl group-containing (meth) acrylate, then making a reaction of a polyol compound and finally making a reaction of the hydroxyl group-containing (meth)acrylate again.

The methods 2 to 4, out of the methods 1 to 4, are preferred for controlling the molecular weight distribution.

Examples of the polymerizable monomer are: trimethylolpropane tri(meth)acrylate, ditrimethylolpropane tetra(meth)acrylate, pentaerythritol tri(meth)acrylate, pentaerythritol tetra(meth)acrylate, dipentaerythritol penta(meth)acrylate, dipentaerythritol hexa(meth)acrylate, glycerin tri(meth)acrylate, tris(2-hydroxyethyl)isocyanurate tri(meth)acrylate, ethylene glycol di(meth)acrylate, 1,3-butanediol di(meth)acrylate, 1,4-butanediol di(meth)acrylate, 1,6-hexanediol di(meth)acrylate, neopentyl glycol di(meth)acrylate, diethylene glycol di(meth)acrylate, triethylene glycol di(meth)acrylate, dipropylene glycol di(meth)acrylate, bis(2-hydroxyethyl)isocyanurate di(meth)acrylate, bis((meth)acryloyloxymethyl)tricyclo[5.2.1.02,6]decane, poly(meth)acrylates as ethylene oxide or propylene oxide adduct to starting alcohol when manufacturing such compounds, oligoester(meth)acrylates, oligoether(meth)acrylates, oligourethane(meth)acrylates and oligoepoxy(meth)acrylates respectively having two or more (meth)acryloyl groups in a molecule, and so on.

Examples of the photopolymerization initiator are: 2,2-dimethoxy-2-phenylacetophenone, 2-hydroxy-2-methyl-1-phenylpropane-1-one, 1-hydroxycyclohekyl phenyl ketone, 2,4,6-trimethyl benzoil diphenyl phosphine oxide, 2-methyl-1-[4-(methylthio)phenil]-2-morpholinopropane-1-one, 2-(dimethylamino)-1-[4-(morphorinyl)phenyl]-2-(phenylmethyl)-1-butanone, and so on.

A method of forming "the composition layer containing a resin having polymerizable functional groups such as ethylenically unsaturated groups and/or an urethane(meth)acrylate oligomer, a polymerizable monomer, a photopolymerization initiator and so on" on a film applies a composition in which each of the above components is dissolved in a solvent such as methyl isobutyl ketone, acetone, methyl ethyl ketone, cyclohexanone, tetrahydrofuran, dioxane, ethylene glycol monomethyl ether, ethylene glycol ethyl ether acetate, diethylene glycol ethyl ether acetate, toluene, ethyl acetate or 2-hydroxypropionic acid ethyl on a film using a method such as roll coating, gravure coat or die coating and then removes (dries) the solvent, thereby forming a photosensitive composition layer. At this time, about 5 mass % of solvent may remain within the range in which the properties as a dry film are not degraded.

Instead of the above-described photopolymerization initiator, a pyrolytic radical generator such as 2,2'-azobisisobutyronitrile, 2,2'-azobis(2,4-dimethylvaleronitrile), 2,2'-azobis-(4-methoxy-2'-dimethylvaleronitrile), benzoyl peroxide, lauroyl peroxide or t-butylperoxypivalate may be used to form a thermosetting composition.

FIGS. 1A to 1E show a method of manufacturing a lower substrate and a core portion in a method of manufacturing an optical waveguide according to the embodiment. First, as shown in FIG. 1A, a solution in which a first photo-curable resin is dissolved in a solvent is applied on a lower base film 11. Then, the solvent is vaporized, thereby laminating a photo-curable resin layer 12 for clad formation on the lower base film 11. The photo-curable resin layer 12 for clad formation changes into a lower clad layer 13 when exposed to light. A lower substrate portion 10 in which the lower clad layer 13 is laminated on the lower base film 11 is thereby formed (cf. FIG. 1B).

On the lower substrate portion 10, a solution containing a second photo-curable resin that is adjusted to become a layer having a higher refractive index than the lower clad layer 13 is applied. Then, the solvent is vaporized, thereby laminating a photo-curable resin layer 21 for core formation (cf. FIG. 1C). The part of the photo-curable resin layer 21 for core formation other than a position to become a core portion is masked and light is applied, thereby forming a core portion 22 (cf. FIG. 1D). The part other than the core portion 22 is removed by development. The core portion is thereby formed (cf. FIG. 1E).

FIGS. 2A to 2D show a method of manufacturing an upper substrate in a method of manufacturing an optical waveguide according to the embodiment. A solution in which a first photo-curable resin is dissolved in a solvent is applied on an upper base film 31. Then, the solvent is vaporized, thereby laminating a photo-curable resin layer 32 for clad formation on the upper base film 31 (cf. FIG. 2A). The photo-curable resin layer 32 for clad formation changes into an upper clad layer 33 when exposed to light (cf. FIG. 2B).

On the upper clad layer 33, the solution in which the first photo-curable resin is dissolved in a solvent is applied again. Then, the solvent is vaporized, thereby laminating a photo-curable resin layer 34 for clad formation on the upper clad layer 33 (cf. FIG. 2C). Compositions for forming the photo-curable resin layer 34 for clad formation and the upper clad layer 33 may be the same composition or different compositions. The photo-curable resin layer 34 for clad formation preferably has a film thickness of 1 to 1.2 times the height of the core portion 22. This is because if the film thickness of the photo-curable resin layer 34 for clad formation is smaller than the height of the core portion 22, there is a possibility that a gap is generated between the lower clad layer 13 and the photo-curable resin layer 34 for clad formation at the time of subsequent bonding with a lamination in which the core portion 22 is formed. On the other hand, if the film thickness of the photo-curable resin layer 34 for clad formation is larger than 1.2 times the height of the core portion 22, the workability when bonding with a lamination in which the core portion 22 is formed is degraded. On the photo-curable resin layer 34 for clad formation, a release film 35 may be formed for facilitating handling as a dry film (cf. FIG. 2D). An upper substrate portion 30 is thereby formed.

Figure 3A:
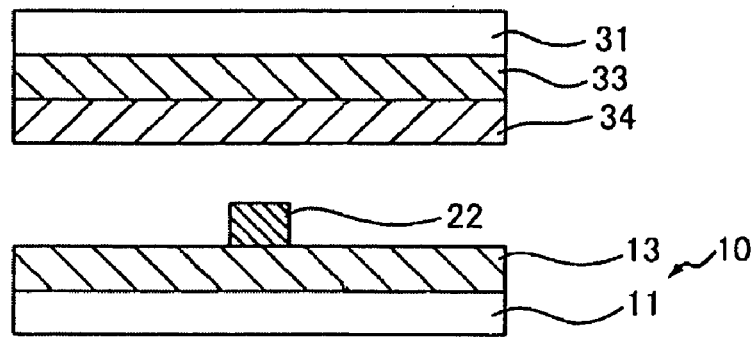
FIG. 3A is a view showing a first step in a method of manufacturing an optical waveguide according to the present invention.
Figure 3B:
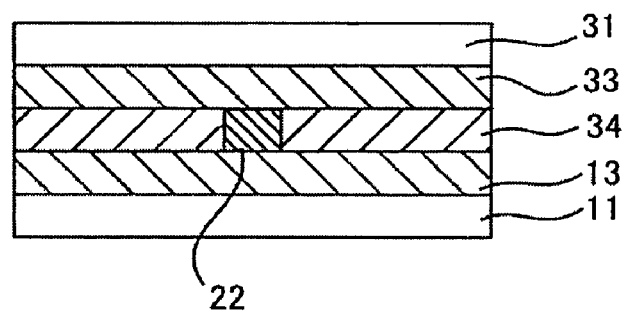
FIG. 3B is a view showing a second step in a method of manufacturing an optical waveguide according to the present invention.
Figure 3C:
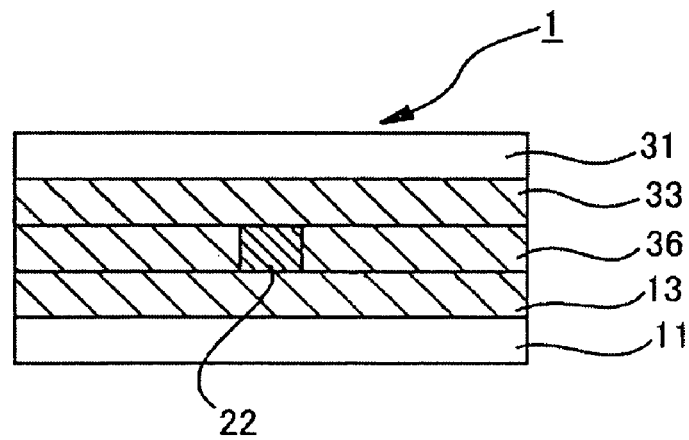
FIG. 3C is a view showing a third step in a method of manufacturing an optical waveguide according to the present invention.
Figure 4A:
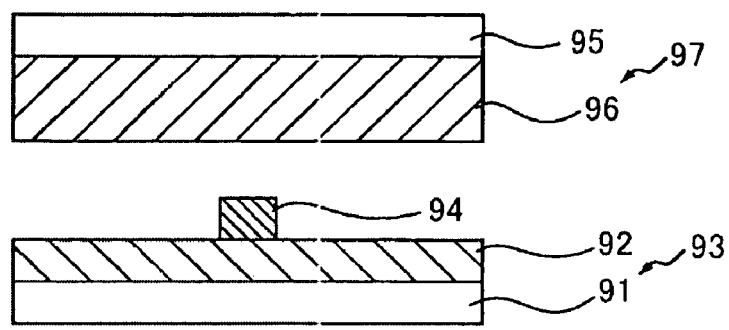
FIG. 4A is a view showing a first step in a method of manufacturing an optical waveguide according to a related art.
Figure 4B:
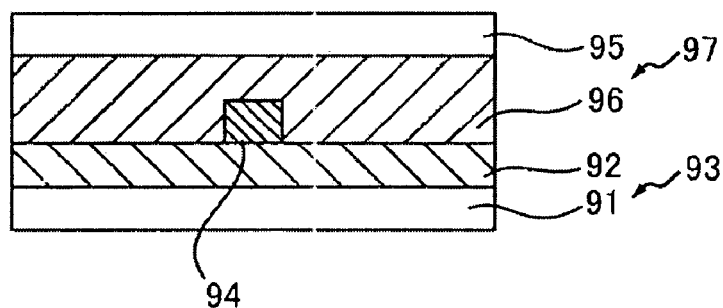
FIG. 4B is a view showing a second step in a method of manufacturing an optical waveguide according to a related art.
Figure 4C:
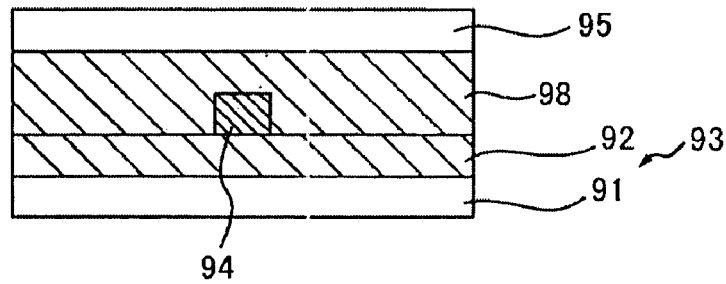
FIG. 4C is a view showing a third step in a method of manufacturing an optical waveguide according to a related art.

FIGS. 3A to 3C show a method of manufacturing an optical waveguide according to the embodiment. In the state of the upper substrate portion 30, the photo-curable resin layer 34 for clad formation is not yet cured. Thus, the photo-curable resin layer 34 for clad formation is still flexible. Then, as shown in FIG. 3A, the side of the lower substrate portion 10 on which the core portion 22 is formed and the side of the upper substrate portion 30 on which the photo-curable resin layer 34 for clad formation is placed are bonded together. At this time, if the release film 35 is formed on the photo-curable resin layer 34 for clad formation, it is necessary to remove the release film 35.

As a result of the bonding in the above manner, the photo-curable resin layer 34 for clad formation is placed to surround the core portion 22 as shown in FIG. 3B. At this time, the photo-curable resin layer 34 for clad formation possibly protrudes from the area above the lower clad layer 13, and the protruded portion is eliminated. Further, when bonding the lower substrate portion 10 and the upper substrate portion 30 together, they are bonded so that the core portion 22 comes into contact with the upper clad layer 33. After that, by exposure to light, the photo-curable resin layer 34 for clad formation is cured to change into a clad layer 36 (cf. FIG. 3C).

In this way, the photo-curable resin layer 34 for clad formation is placed between the cured upper clad layer 33 and the cured lower clad layer 13, and the core portion 22 that is interposed between the upper clad layer 33 and the lower clad layer 13 functions as a spacer. It is thereby possible to uniform the thickness of the clad layer between the upper base film 31 and the lower base film 11. Further, because the previously cured clad layers 13 and 33 are placed between the core portion 22 and the upper base film 31 and between the core portion 22 and the lower base film 11, it is possible to uniform the thickness of the clad layers placed above and below the core portion 22. Because the thickness of the clad layer in the vicinity of the core portion 22 is thus uniform, it is possible to improve the optical properties of light propagating through the core portion 22.

The lower base film 11 or the upper base film 31 preferably transmits light for caring the photo-curable resin that is used in the above-described manufacturing method. This enables incidence of the light for curing the photo-curable resin through the base film. The photo-curable resin can be thereby cured easily.

Further, a relative index difference Δ between the clad layers 13, 33, 36 and core portion 22 is preferably 1% or larger. The relative index difference Δ is a value that can be represented by the following expression:

$$\Delta = (n1-n2)/n1$$

where n1 is a refractive index of the core portion 22, and n2 is a refractive index of the clad layers 13, 33, 36. This traps the light in the core portion 22, thereby creating a suitable optical waveguide.

Furthermore, it is preferred to create the core portion 22 and the clad layers 13, 33, 36 using the same constituent with a different compositional ratio. The adhesiveness between the core portion 22 and the clad layers 13, 33, 36 is improved by creating them using the same constituent with a different compositional ratio. Further, light for curing the photo-curable resin is preferably ultraviolet light. This is because the use of ultraviolet light enables use of a transparent base film and resin.

In the method of manufacturing an optical waveguide as described above, because the photo-curable resin layer 34 for clad formation is placed between the cured lower clad layer 13 and the cured upper clad layer 33, the core portion 22 can be surrounded by the photo-curable resin layer 34 for clad formation. Further, when the upper substrate portion 30 from which the release film 35 is removed is pressed on top of the lower substrate portion 10 in which the core portion 22 is formed, the cured upper clad layer 33 and the core portion 22 come into contact with each other, so that the thickness between the lower base film 11 and the upper base film 31 is uniquely determined.

Further, the thickness of the upper clad layer 33 on the side of the upper base film 31 and the thickness of the lower clad layer 13 on the side of the lower base film 11 above and below the core portion 22 are uniform because they are cured in advance. It is thereby possible to maintain a uniform position of the core portion 22 in the clad layer. Therefore, the positioning with an optical element is easy, and the bending durability as a film waveguide is enhanced.

The present invention is not limited to the above-described embodiment, and various changes may be made without departing from the scope of the invention. The curable resin is not limited to a photo-curable resin, and a thermosetting resin may be used.

The invention claimed is:

1. A method of manufacturing an optical waveguide comprising a core portion allowing propagation of light and a clad portion placed to surround the core portion, the method comprising:
    bonding a first lamination film comprising
        a first base film,
        a first clad layer formed on the first base film, and
        a core portion formed on the first clad layer and having a higher refractive index than the first clad layer, with a second lamination film comprising
        a second base film, and
        a second clad layer formed on the second base film in such a way that the core portion of the first lamination film and the second clad layer of the second lamination film face each other with a curable resin layer for clad formation interposed therebetween, the core portion having a convex shape; and
    curing the curable resin layer for clad formation interposed between the first lamination film and the second lamination film.

2. The method of manufacturing an optical waveguide according to claim 1, wherein
    light transmitted through the first base film and the second base film is used for curing the curable resin layer.

3. The method of manufacturing an optical waveguide according to claim 1, wherein
a relative index difference between the first and the second clad layers and the core portion is 1% or larger.

4. The method of manufacturing an optical waveguide according to claim 1, wherein
the clad layer and the core portion are made of the same constituent with a different compositional ratio.

5. The method of manufacturing an optical waveguide according to claim 1, wherein a film thickness of the cured curable resin layer for clad formation is equal to a height of the core portion.

6. The method of claim 1, wherein the curable resin layer comprises, prior to curing, a resin comprising at least one of ethylenically unsaturated groups and/or a urethane (meth)acrylate oligomer.

7. The method of claim 6, wherein the resin comprises the ethylenically unsaturated groups.

8. The method of claim 6, wherein the resin comprises the urethane (meth)acrylate oligomer.

9. The method of claim 8, wherein the urethane (meth)acrylate ologimer is a reactant of a polyol compound, a polyisocyanate compound, and a hydroxyl group-comprising (meth)acrylate.

10. The method of claim 9, wherein the polyol compound is at least one selected from an aromatic polyether polyol, an aliphatic polyether polyol, an alicyclic polyether polyol, a polyester polyol, a polycarbonate polyol, a polycaprolactone polyol, a polyether polyol compound comprising an alkylene oxide structure, and combinations thereof.

11. The method of claim 8, wherein the number-average molecular weight of the urethane (meth)acrylate oligomer ranges from 1,000 to 100,000.

12. The method of claim 8, wherein the number-average molecular weight of the urethane (meth)acrylate oligomer ranges from 3,000 to 60,000.

13. The method of claim 8, wherein the number-average molecular weight of the urethane (meth)acrylate oligomer ranges from 5,000 to 30,000.

14. A method of manufacturing an optical waveguide comprising a core portion allowing propagation of light and a clad portion placed to surround the core portion, the method comprising:
bonding a first lamination film comprising
a first base film,
a first clad layer formed on the first base film, and
a core portion formed on the first clad layer and having a higher refractive index than the first clad layer with a second lamination film being a dry film comprising
a second base film,
a second clad layer formed on the second base film, and
a curable resin layer formed on the second clad layer and made of a curable resin for clad formation in such a way that the core portion of the first lamination film and the curable resin layer of the second lamination film face each other, the core portion being formed in a convex shape; and
curing the curable resin layer.

15. The method of manufacturing an optical waveguide according to claim 14, wherein
light transmitted through the base film is used for curing the curable resin layer.

16. The method of manufacturing an optical waveguide according to claim 14, wherein
a relative index difference between the clad layer and the core portion is 1% or larger.

17. The method of manufacturing an optical waveguide according to claim 14, wherein
the clad layer and the core portion are made of the same constituent with a different compositional ratio.

18. The method of manufacturing an optical waveguide according to claim 14, wherein the curable resin layer of the second lamination film is formed to a film thickness of 1 to 1.2 times a height of the core portion.

19. The method of manufacturing an optical waveguide according to claim 14, wherein a film thickness of the cured curable resin layer of the second lamination film is equal to a height of the core portion.

* * * * *

UNITED STATES PATENT AND TRADEMARK OFFICE
CERTIFICATE OF CORRECTION

PATENT NO. : 7,916,992 B2
APPLICATION NO. : 12/373564
DATED : March 29, 2011
INVENTOR(S) : Yuichi Eriyama Page 1 of 1

It is certified that error appears in the above-identified patent and that said Letters Patent is hereby corrected as shown below:

On the title page, Item (87), the PCT Pub. Date is incorrect. Item (87) should read:

-- PCT Pub. No.: WO2008/010502
PCT Pub. Date: Jan. 24, 2008 --

Signed and Sealed this
Twelfth Day of July, 2011

David J. Kappos
*Director of the United States Patent and Trademark Office*